United States Patent
Villanueva Cañizares et al.

(10) Patent No.: US 12,380,246 B2
(45) Date of Patent: Aug. 5, 2025

(54) AUTOMATED ANONYMIZATION OF NON-STRUCTURED AND SEMI-STRUCTURED DOCUMENTS

(71) Applicant: NYMIZ SOFTWARE COMPANY, S.L., Bilbao (ES)

(72) Inventors: Oscar Villanueva Cañizares, Sopelana (ES); Manuel Díaz Ramírez, Bilbao (ES)

(73) Assignee: NYMIZ SOFTWARE COMPANY, S.L., Bilbao (ES)

( * ) Notice: Subject to any disclaimer, the term of this patent is extended or adjusted under 35 U.S.C. 154(b) by 128 days.

(21) Appl. No.: 18/393,853

(22) Filed: Dec. 22, 2023

(65) Prior Publication Data

US 2025/0209204 A1    Jun. 26, 2025

(51) Int. Cl.
*G06F 21/62* (2013.01)
*G06F 40/295* (2020.01)
*G06F 40/40* (2020.01)

(52) U.S. Cl.
CPC ........ *G06F 21/6254* (2013.01); *G06F 40/295* (2020.01); *G06F 40/40* (2020.01)

(58) Field of Classification Search
CPC ..... G06F 21/6254; G06F 40/295; G06F 40/40
See application file for complete search history.

(56) References Cited

U.S. PATENT DOCUMENTS

2019/0018983 A1*  1/2019  Anderson ............... G06F 21/64
2019/0354720 A1*  11/2019 Tucker .................. G06F 40/295
2020/0110903 A1*  4/2020  Reilly ................... H04N 1/4446
2020/0334381 A1*  10/2020 Yarowsky ............. G06F 40/166
2021/0150060 A1*  5/2021  Dash .................... G06F 21/6254
2021/0256160 A1   8/2021  Hachey
2023/0022845 A1*  1/2023  Meng .................... G06F 40/279
2023/0195933 A1   6/2023  Satish Padmanabhan et al.
2023/0282322 A1   9/2023  Rajkumar et al.

OTHER PUBLICATIONS

"Optical Character Recognition", Wikipedia, Oct. 31, 2023, https://en.wikipedia.org/w/index.php?title=Optical+character+recognition&oldid=1182730855.
"OCRmyPDF", MobileRead Wiki—OCRmyPDF, Jan. 22, 2018, https://wiki.mobileread.com/w/index.php?title=0CRmyPDF&oldid=47953#google_vignette.

* cited by examiner

*Primary Examiner* — Frantz B Jean
(74) *Attorney, Agent, or Firm* — Wood Herron & Evans LLP

(57) ABSTRACT

A method for anonymizing documents wherein, upon a user's request 100 for anonymization of a document 10, firstly the document 10 is classified 110 by detecting 11 its format 12. For standard content like Word, Excel, or raw text, plugins 141, 142, 143 extract the content directly. For image formats 13, an OCR task 130 is initiated via plugin 144 and PDF documents 14, with mixed content, are converted to images 121 and undergo the same OCR 130 process. After extraction 140, content is fed into a prediction model that identifies PII in the text 15 using NLP and patterns. Based on PII labeling 150, a redaction plugin 16 specific to the detected format 12 modifies the document using processes like masking. The anonymized modified document is then delivered 17 to the user via a GUI or API.

11 Claims, 2 Drawing Sheets

AUTOMATED ANONYMIZATION OF NON-STRUCTURED AND SEMI-STRUCTURED DOCUMENTS

TECHNICAL FIELD

The present invention relates generally to computing systems and, specifically, using artificial intelligence and has its application within Personal Data Anonymization techniques.

More particularly, the present invention refers to an automated method designed for the anonymization and pseudonymization of information found within non-structured and semi-structured documents.

BACKGROUND OF THE INVENTION

In today's age, where personal data protection stands paramount, the task of shielding identifiable information in documents presents numerous challenges. While structured databases have methodologies in place for systematic encryption or redaction, non-structured and semi-structured documents, which include formats like emails, handwritten notes, reports, and social media updates, typically contain information in an unpredictable and free-flowing manner.

In the context of anonymization procedures, particularly in data processing and document handling, the terms "entity" and "element" have specific meanings:

An entity in anonymization refers to any individual, group, object, or concept that can be distinctly identified. This is often a personal or sensitive piece of information that needs to be protected or anonymized. For example, in a text document, entities might include personal names, addresses, phone numbers, or other identifiers that could be used to trace back to an individual. In a broader data context, entities could also refer to businesses, locations, or any other definable item.

An element of a document refers to any distinct part of the document that can contain information. This might include text strings, paragraphs, tables, images, metadata, etc. Each element can contain one or more entities that might need anonymization. For instance, a paragraph (element) in a report could contain the name of a person (entity) and their email address (another entity).

In anonymization procedures, identifying these entities and elements is crucial. The goal is to modify or remove entities (like personal data) within the elements of the document (like paragraphs, tables, etc.) to prevent the identification of individuals, thereby ensuring privacy and compliance with data protection regulations.

Traditional techniques, such as basic pattern-matching algorithms or manual redaction, although employed, are inundated with challenges. Notably: Manual Limitations: Human-based redaction is not only cumbersome but fraught with errors, often leading to missed sensitive information or unintended disclosure. Algorithmic Limitations: Conventional algorithms might generate false positives, or neglect data that does not align with predefined patterns, given the varied nature of semi-structured documents.

Furthermore, the intricate formats and varying quality of documents have compounded the issue. For instance, PDFs, being hybrid in nature, contain a blend of text, diagrams, images, and more. Existing methods often require these documents to be converted into images for text recognition, further complicating the process.

A significant challenge has also been the identification and redaction of Personal Identifiable Information (PII) within these documents. While conventional Natural Language Processing (NLP) methods and models show promise in understanding text content, the diversity of document formats, the plethora of layouts, and the different document quality tiers make PII identification an intricate endeavour.

In light of these challenges, there is an evident gap in the current technology-a void that calls for a system adept at automatically recognizing and managing varied document formats, while precisely detecting and anonymizing PII. The ideal solution would need to ensure that the semantics and context of the content remain unaltered, irrespective of the document's distribution of content.

Furthermore, training such a system poses its own set of challenges. A contradiction emerges: the requirement of PII-containing documents for system training in an era where these exact PII elements need utmost protection. The need for a rich dataset, built while navigating the complexities of data protection regulations and ensuring the sanctity of sensitive information, is paramount.

Therefore, there is a need of providing a ML model to anonymize different types of documents, non-structured or semi-structured, while keeping a balance between a fully automated workflow and the best possible PII detection.

SUMMARY OF THE INVENTION

The problems found in prior art techniques are generally solved or circumvented, and technical advantages are generally achieved, by the disclosed embodiments which provide a method (and related computer program product) for anonymizing documents.

An aspect of the present invention refers to a computer-implemented method defined by the independent claim 1. The dependent claims define advantageous embodiments.

Another aspect of the invention relates to a computer program product comprising instructions that, when the program is executed by a computer, cause it to carry out the method defined above.

Another aspect of the invention relates to a computer-readable medium comprising instructions that, when executed by the computer, cause it to execute the method defined above.

The method in accordance with the above-described aspects of the invention has a number of advantages with respect to the aforementioned prior art, which can be summarized as follows:

The automated classification and extraction of the content of different types of documents. Existing solutions either work only with raw text or process multiple types of documents but are aimed at data lakes and specially data governance tasks. The present invention is truly agnostic on the document type and format.

The training and provision of a unique model capable of finding personally identifiable information (PII) in unstructured and semi-structured documents with high confidence.

Flexibility of the approach, integration possibilities with third party products and future growth capabilities.

BRIEF DESCRIPTION OF THE DRAWINGS

To complete the description that is being made and with the object of assisting in a better understanding of the characteristics of the invention, in accordance with a preferred example of practical embodiment thereof, accompa

DESCRIPTION OF EMBODIMENTS

The present invention may be embodied in other specific systems and/or methods. The described embodiments are to be considered in all respects as only illustrative and not restrictive. In particular, the scope of the invention is indicated by the appended claims rather than by the description and drawings herein. All changes that come within the meaning and range of equivalency of the claims are to be embraced within their scope.

Figure 1:
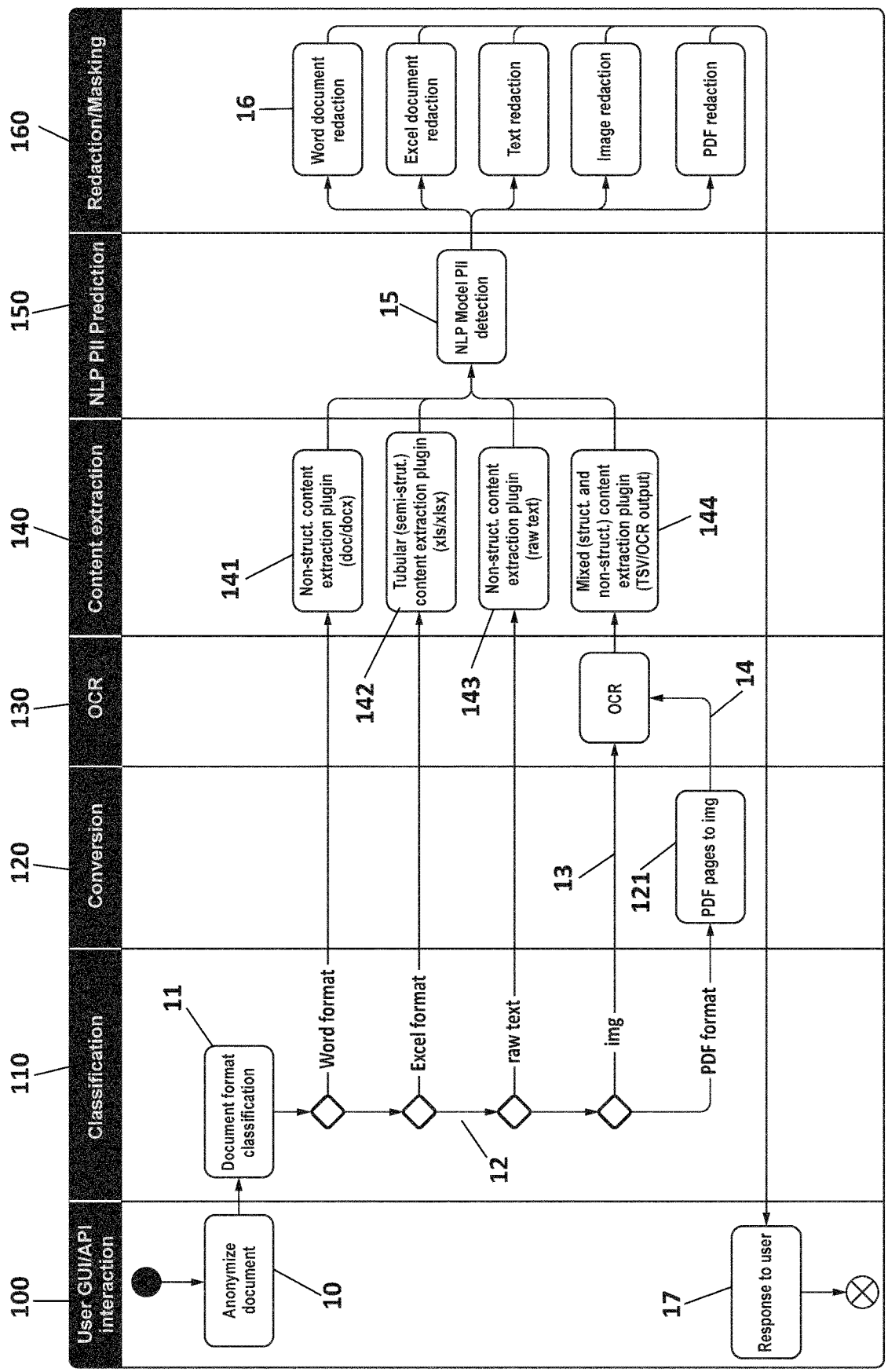
- FIG. 1 shows a workflow of the method for anonymizing different types of documents, according to a possible embodiment of the present invention.

FIG. 1 shows an Activity Diagram that illustrates an overview of the present solution workflow, which comprises the following main steps:

- 100 Anonymization or pseudonymization request: Interaction of the user through a graphical user interface (GUI) or by using an application programming interface (API) to input/output a document 10.
- 110 Classification of the document 10 to be anonymized according to its format
- 120 Conversion
- 130 Application of optical character recognition (OCR)
- 140 Extraction of the content from the document 10 based on its type/format
- 150 Application of a natural language processing (NLP) predictor model to detect personally identifiable information (PII)
- 160 Redaction and Masking of the anonymized document Referring to FIG. 1 further in detail, once the user requests 100 the anonymization (or pseudonymization) of the document 10, the first step is the classification 110 of the document 10 by detecting 11 its format 12: docx, pdf, etc. In a possible embodiment, this task is focused on content type detection. In another possible embodiment, the internal content and structure of the document can also be analyzed to preprocess the information and bring layout context to the NLP component. Additionally, business context information can also be extracted to enable an automated results checker such as "if the content is of this kind, at least this number of PII terms should be detected". If the document format is non-structured or semi-structured content, like Word (non-structured content), Excel (tabular content) or raw text, the document is sent to one of different plugins, 141, 142, 143, whose mission is to extract the internal content, with different versions specialized for each format. The key here is again automation: the system itself has the knowledge on how to extract and format the information to maximize the NLP predictions. If the document is in image format 13, a previous step is added: a task of OCR 130 that converts the document content into text through the mixed content plugin 144. For PDF documents 14, which comprises mixed (non-structured and structured) content, an additional challenge arises: PDF is a hybrid format that can include text, images, diagrams and literally any type of static information, layouts and even form fields, and so, to keep the automated workflow, the solution consists in converting every page of the document to images 121 and then sending them to the same OCR 130 component involved in image documents. Once the step 140 is completed by applying the plugin, 141, 142, 143 or 144, corresponding to the detected format 12 of the document 10, the extracted content of the document 10 is loaded into the prediction model, which labels the PII in the text 15 by using a combination of context-aware NLP detection and a patterns engine. Based on the PII labeling performed in the step 150, a plugin from another set of redaction plugins 16, the redaction plugin corresponding to the detected format 12, retrieves the original document and apply the corresponding modifications (masking, blacklining, tokenization, etc.). The modified anonymized document is delivered 17 to the user through the GUI or API.

In order to obtain a single prediction model capable of finding PII in unstructured and semi-structured documents with high confidence, the following technologies and processes are implemented:

Leverage the efficiency and effectiveness of the predictions through the use of a state-of-the-art ML stack:

A Hugging Face BERT-architecture multi-language model is used as the base layer. This model was trained with the content of Wikipedia and its internal architecture consists of 12 layers, 12 attention heads, 110 million parameters and has output size of 768 dimensions. It serves as the typical encoder needed in a Transformer family model. This architecture is generally considered the state-of-the art for NLP models outside the LLM world and its implementation means the best technological approach that is currently available.

Manual and automated labeling using tools like UBIAI, Prodigy, Argilla, Tesseract, Textract, OpenCV and CRF. Post-processing third party and ad-hoc tools are used to constantly monitor the weights and biases of the model and the outcome of the automated context extraction of a test set of documents. This way, the theoretical precision and recall, as well as the empirical results of the end-to-end process are contrasted against each other. Multiple tools are used to thoroughly and constantly test the model performance. Not only lab testing but with wildlife documents and edge cases.

Gathering and distillation of a high quality dataset:

Lack of documents for proper training is an historical pain point for AI models training. And in this case a paradox is faced: the need of documents with PII in order to train a model for detecting them, in a highly regulated market whose PII is the target to be protected. There are a number of repositories with public access available online, but often with poor-quality data, scraping protected and/or restrictive usage policies in place. The proposed model is not generalist like the large language models, which can be trained with almost any written content available on the Internet. In the present case, the corpus had to fulfill the condition that its contents included the same type of information that is to be protected. With all these challenges and constraints, the task at hand consisted of finding repositories, assessing the legal restrictions in each case with the help of external legal staff, gathering the documents and classifying them in order to get the richest ones. Most of the time the post-processing involved cleansing and data augmentation techniques. In some other cases, anonymizing the content with synthetic data of similar nature and extension.

One of the outcomes is a high-quality dataset that, through the consent of the clients and corresponding DPAs (Data Protection Agreements) signing, was constantly fed. The labeling of this dataset is made with the most careful measures in place, already stated in the ISO 27001 implementation.

The prediction model itself is a neural network with the encoders, embeddings, weights of the network and six neurons, one for each infotype of context-based PII to be detected (person name, dates, company name, address, location and amount).

The following Table 1 is a table with the weights and biases measured over the trained ML model (prediction model), showing precision and recall among other variables:

TABLE 1

| Variable | Value |
| --- | --- |
| loss | 0.04200359433889389 |
| overall_accuracy | 0.9922688822510604 |
| overall_f1 | 0.8879598662207357 |
| overall_precision | 0.8872180451127819 |
| overall_recall | 0.8887029288702929 |
| runtime | 5.038 |
| samples_per_second | 175.466 |
| steps_per_second | 11.115 |
| epoch | 10 |
| global_step | 2210 |
| learning_rate | 4.5248868778280555e-8 |
| loss | 0.0092 |
| total_flos | 3818351210865752 |
| train_loss | 0.039369024659983175 |
| train_runtime | 1065.6471 |
| train_samples_per_second | 33.144 |
| train_steps_per_second | 2.074 |

In the above Table 1, specific definitions of the following variables are used:

The variable «loss» represents a measure of how well the model's predictions match the true values. A value of «loss» quantifies the difference between the predicted and actual values. Hence, a lower value of «loss» indicates that the model is making better predictions, while a higher value of «loss» suggests the opposite. During training, the goal is to minimize this value of «loss», which can lead to a more accurate model.

The variable of «precision» represents a measure of how much sure the model is about a certain entity prediction. The higher, the lower the chance of failing. An entity is defined as personal data, grouped or not, within the elements of a document (e.g., in the phrase "Mr. Julio López González has been sued", the set of words "Julio López González" represents a named entity, in this case, the name of a male person).

The variable of «recall» represents a measure of how many entities were anonymized. The higher, the more entities are anonymized and the fewer remain unanonymized.

The variable called «f1» in Table 1 refers to the armonic average value of the variables «precision» and «<recall».

This trained model has come from a thoroughly distilled corpus and is very specialized on the task at hand, as well as it achieves the goal of providing a balance between a fully automated workflow and the best possible PII detection. Regardless of how good a NLP model can be at understanding the content of a text, a main challenge is the virtually infinite variety of formats, layouts and document qualities that the model can face. The proposed model deals with this complexity in a way as generic as possible but at the same time flexible enough to adapt to different use cases. This goal is achieved by an algorithm introduced in all layers of the system and that concentrates and represents the abstractions that can be found in a document and its operations, so that the automated anonymization method can extract the content in such a way that the context and the semantics of the text are not lost despite the enormous variability of content distribution. This algorithm is also optimized to represent internally the concrete information in the most efficient way for the operations that need to be carried out during the described functional flows, the algorithm representing the elements that can hold PII inside a document, i.e.:

Text blocks
Tables
Images (which in turn can also contain sub-elements)
Individual graphic elements (e.g.: logos, QR codes, barcodes, handwritten signatures, etc.)
Metadata (author, creator, form fields information, digital signature, etc.)

Figure 2:
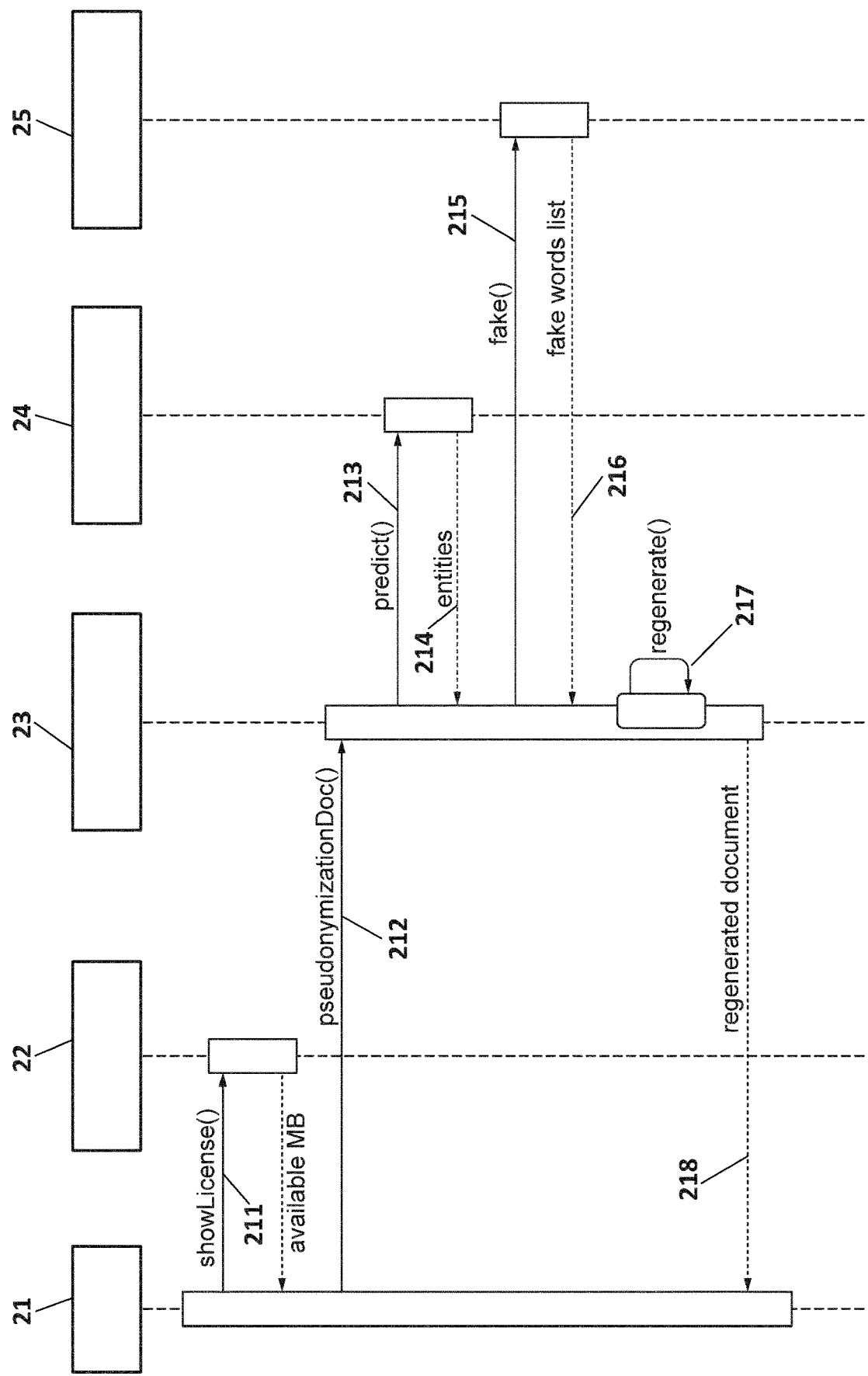
FIG. 2 shows a sequence diagram of the components and steps involved in the anonymization method, according to a possible embodiment of the present invention.

The elements above listed (text blocks, tables, etc.) can, in turn, contain the entities shown in FIG. 2. The algorithm brings the context to the NLP model for a better prediction of the PII presence.

Thus, the highly specialized dataset used in training the model, the abstraction layer/algorithm to represent the elements of the document that are candidates to hold PII and the coordinated flow of the method result in an efficient content extraction, effective predictions and secure return of the anonymized document to the user.

FIG. 2 shows a high-level sequence diagram of the components and steps involved in the pseudonymization, as follows:

Once the user requests 212 the protection of a document, either through a Web User Interface or Web UI 21 either through a Representational State Transfer Application Programming Interface or REST API, and after a license validation 211 against a configuration API of a customer controller 22, the automated content extraction according to the steps described in FIG. 1 begins and involves the exchange of the request "predict( )" for prediction of PII in the content 213 from the API controller of the anonymization algorithm 23 to the NLP API controller 24 which analyzes the text and, in response, delivers 214 the entities.

After the prediction of PII in the content ends, the next step is to fake 215 the Named Entities, i.e., PII words or phrases. For that sake, the faker component 25 calculates unique, faked, pseudonyms 216 for each delivered entity.

With the PII predictions and the faked pseudonyms, the original document content is regenerated 217, effectively pseudonymizing the personal data.

The modified document is sent back 218 to the client.

The entire method is encompassed within a singular or multiple containerized environments for enhanced automation and ease of deployment. In a possible embodiment, a relational database is used by the execution environment, the database being outside the APIs execution environment or it can be "packed" with the rest of the components inside a Docker Compose network (among other containerization options). In fact, the whole set of execution environments (business APIs, models APIs, NLP API and database) can be packed with the help of any known containerization technologies.

The steps of the automated anonymization are executed by one processor of a personal computer, a laptop, a tablet, a smartphone or any programmable device providing an interface to input/output documents.

Note that in this text, the term "comprises" and its derivations (such as "comprising", etc.) should not be understood in an excluding sense, that is, these terms should not be interpreted as excluding the possibility that what is described and defined may include further elements, steps, etc.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. The invention in its broader aspects is therefore not limited to the specific details, representative apparatus and methods and illustrative examples shown and described. Accordingly, departures may be made from such details without departing from the scope or spirit of Applicant's general inventive concept.

The invention claimed is:

1. A computer-implemented method for anonymizing documents, the method comprising receiving an anonymization request of a document from a user, the method characterized by comprising the following steps executed by one or more processors:
    detecting a document format of the received document from a plurality of document formats;
    selecting a plugin from a plurality of plugins which are configured to extract content from documents, the plugin being selected based on the detected format of the received document;
    extracting content from the received document by means of the selected plugin;
    applying a natural language processing model to predict personal identifiable information within the extracted content;
    modifying the received document by at least pseudonymizing the predicted personal identifiable information; and
    sending the modified document to the user in response to the anonymization request.

2. The method according to claim 1, wherein modifying the received document further comprises masking, blacklining and/or tokenization.

3. The method according to claim 1, wherein sending the modified document to the user is performed through a user interface or an application programming interface used to receive the anonymization request from the user.

4. The method according to claim 1, wherein the natural language processing model is a BERT-architecture multi-language model configured to identify personal identifiable information.

5. The method according to claim 1, further comprising the step of applying an algorithm configured to represent abstraction of elements within the document, said elements including text blocks, tables, images, individual graphic elements, and metadata.

6. The method according to claim 1, wherein the plurality of plugins configured to extract content from documents comprising non-structured content, tabular content, raw text and images.

7. The method according to claim 1, wherein, if the detected format is PDF format, the method further comprises converting the received document into images before extracting content.

8. The method according to claim 1, further comprising the step of applying optical character recognition if the detected format of the received document is an image format.

9. The method according to claim 1, wherein the steps are executed by one processor of a personal computer, a laptop, a tablet, a smartphone or any programmable device providing an interface to input documents.

10. A computer program product comprising instructions that, when the program is executed by a computer, cause the computer to carry out the method of claim 1.

11. A non-transitory computer-readable medium comprising instructions that, when executed by a computer, cause the computer to carry out the method of claim 1.

* * * * *